(12) United States Patent
Maguire et al.

(10) Patent No.: US 6,783,196 B2
(45) Date of Patent: Aug. 31, 2004

(54) MASTER LINK FOR A TRACK CHAIN

(75) Inventors: Roy L. Maguire, Edelstein, IL (US); Thomas E. Oertley, Dunlap, IL (US); Kevin M. Egle, Medford, WI (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/217,786

(22) Filed: Aug. 13, 2002

(65) Prior Publication Data

US 2004/0032166 A1 Feb. 19, 2004

(51) Int. Cl.⁷ .............................................. B62D 55/20
(52) U.S. Cl. ....................... 305/186; 305/187; 305/198
(58) Field of Search .................................. 305/186, 187, 305/185, 190, 195, 196, 198, 200, 201, 202, 105, 106, 103, 102

(56) References Cited

U.S. PATENT DOCUMENTS

| | | | |
|---|---|---|---|
| 2,957,731 A | * | 10/1960 | Backhaus ..................... 305/41 |
| 3,032,376 A | * | 5/1962 | Blazek et al. ................ 305/168 |
| 3,096,661 A | | 7/1963 | Reinsma et al. |
| 3,179,475 A | * | 4/1965 | Lambie ........................ 305/202 |
| 3,427,079 A | | 2/1969 | Skromme et al. |
| 3,717,389 A | * | 2/1973 | Boggs et al. ............. 152/185.1 |
| 3,822,923 A | | 7/1974 | Stedman |
| 4,050,750 A | | 9/1977 | Yoshihashi et al. |
| 4,093,319 A | * | 6/1978 | Borner ......................... 305/189 |
| 4,105,260 A | | 8/1978 | Blunier et al. |
| 4,332,425 A | | 6/1982 | Baylor |
| 4,351,573 A | | 9/1982 | Bedis et al. |
| 4,365,848 A | | 12/1982 | Grilli et al. |
| 4,455,054 A | | 6/1984 | Brunn |
| 4,457,565 A | | 7/1984 | Bissi et al. |
| 4,579,394 A | | 4/1986 | Bedis et al. |
| 4,583,792 A | * | 4/1986 | Erlenmaier et al. ........... 305/42 |
| 4,636,014 A | | 1/1987 | Dennis et al. |
| 4,775,198 A | | 10/1988 | Bokamp et al. |
| 4,838,623 A | * | 6/1989 | Mineart ...................... 305/204 |
| 5,020,865 A | * | 6/1991 | Edwards et al. ............ 305/182 |
| 5,172,965 A | * | 12/1992 | Taft ............................ 305/187 |
| 5,700,384 A | | 12/1997 | Marchand et al. |
| 5,711,586 A | * | 1/1998 | Anderton et al. ............ 305/201 |
| 6,206,491 B1 | * | 3/2001 | Hisamatsu ................... 305/103 |
| 6,270,173 B1 | * | 8/2001 | Hashimoto et al. ......... 305/202 |
| 6,371,577 B1 | * | 4/2002 | Hasselbusch et al. ....... 305/100 |
| 6,382,742 B1 | * | 5/2002 | Hasselbusch et al. ....... 305/102 |
| 6,386,651 B1 | * | 5/2002 | Gerardin et al. ............ 305/100 |
| 6,478,388 B2 | * | 11/2002 | Maguire ..................... 305/103 |
| 6,564,539 B2 | * | 5/2003 | Bedford et al. ............. 305/202 |

FOREIGN PATENT DOCUMENTS

| | | |
|---|---|---|
| DE | 1222809 | 8/1966 |
| DE | 1280075 | 10/1968 |

* cited by examiner

*Primary Examiner*—Russell D. Stormer
(74) *Attorney, Agent, or Firm*—Jeff A Greene

(57) ABSTRACT

A master link for a track chain assembly is provided. The master link includes a body portion having first and second spaced apart apertures extending therethough. A gap extends radially outward from one of the first and second apertures. At least one fastener operatively engages an aperture that extends through the gap. As the fastener is secured the width of the gap is reduced thereby reducing the diameter of one of the first and second apertures providing a clamping force.

17 Claims, 5 Drawing Sheets

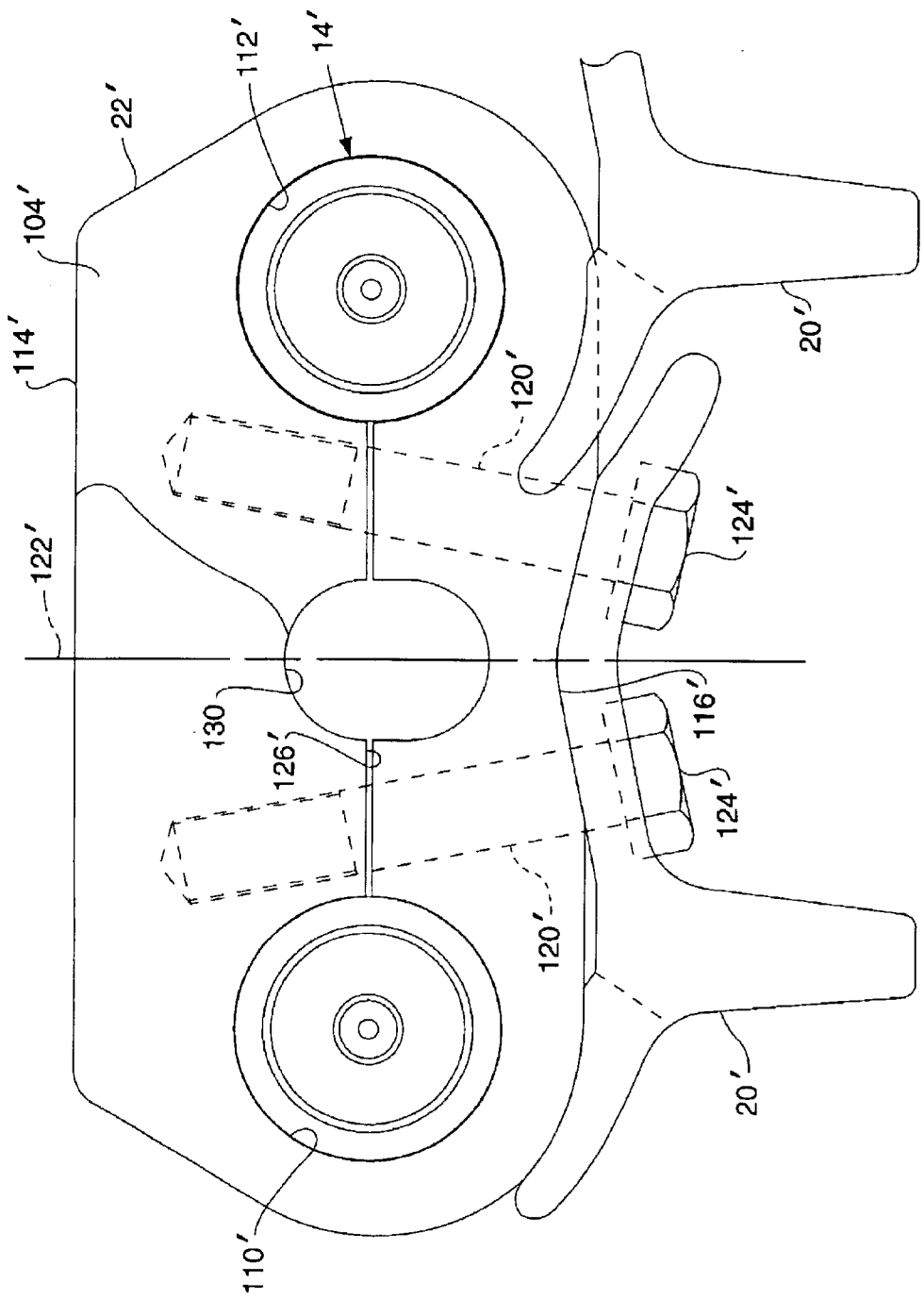

US 6,783,196 B2

MASTER LINK FOR A TRACK CHAIN

TECHNICAL FIELD

The invention relates generally to a track chain for a work machine and, more particularly, to a master link for a track chain assembly.

BACKGROUND

Track laying work machines utilize endless track chains to propel the work machines over the terrain during operation. The track chains typically use a master connection or master link to facilitate the breaking of the track chain to permit its assembly and removal for repair and servicing. The master link is typically a two-piece or split master link with two half-links. In sealed and lubricated track assemblies, this is especially important so as not to damage or disturb any of the sealed joints during assembly and any subsequent repair.

The two half-links have any of a number of interlocking configurations positioned on mating surfaces of each half-link. The interlocking configurations are disposed either along a vertical or a horizontal plane positioned relative to two adjacent track pins or bushings. The two half-links are coupled together by one or more fasteners that are inserted through one half-link and threaded into the other half-link. Often the fasteners are positioned in apertures entering through a mounting surface that receives one of the track shoes. Such bolts are positioned through the track shoe in the same manner as non-master links and are utilized to fasten the track shoe to the link, as well as to retain the half-links together.

Past designs have required two separate manufacturing processes, such as forgings, to create each of the half-links. This forces a manufacturer to have two additional forging operations at much lower production rates than the non-master links. At a minimum, manufacturing the two half-links requires an additional cutting step, such as electrical discharge machining, to separate the half-links and form the mating surfaces. Another problem associated with the use of the prior split master links, is encountered during the attachment of the track shoe to the half-links so as to join the ends of the track chain. This problem results from the necessity to achieve and maintain alignment between the boltholes in the half-links, while placing the track shoe onto the link.

U.S. Pat. No. 4,636,014 for a "Master Track Chain Connection for Crawler Tractors", issued Jan. 13, 1987 to Dennison et al., and assigned to the assignee of the present application, solves part of the problem. In this patent the half-links are secured together by fasteners and then independently securing the track shoe to the split master link.

The present invention is directed to overcoming one or more of the problems as set forth above.

SUMMARY OF THE INVENTION

A master link for a track chain assembly is provided. The master link includes a body portion with a first side, a second side positioned opposite the first side and a shoe surface positioned opposite a rail surface. A first aperture extends through the body portion. Spaced from the first aperture is a second aperture that extends through the body portion. A gap is positioned between the first aperture and the second aperture and extends through the body portion.

BRIEF DESCRIPTION OF THE DRAWINGS

FIG. 5 is a side elevational view of a master link from FIG. 4.

DETAILED DESCRIPTION

Figure 1:
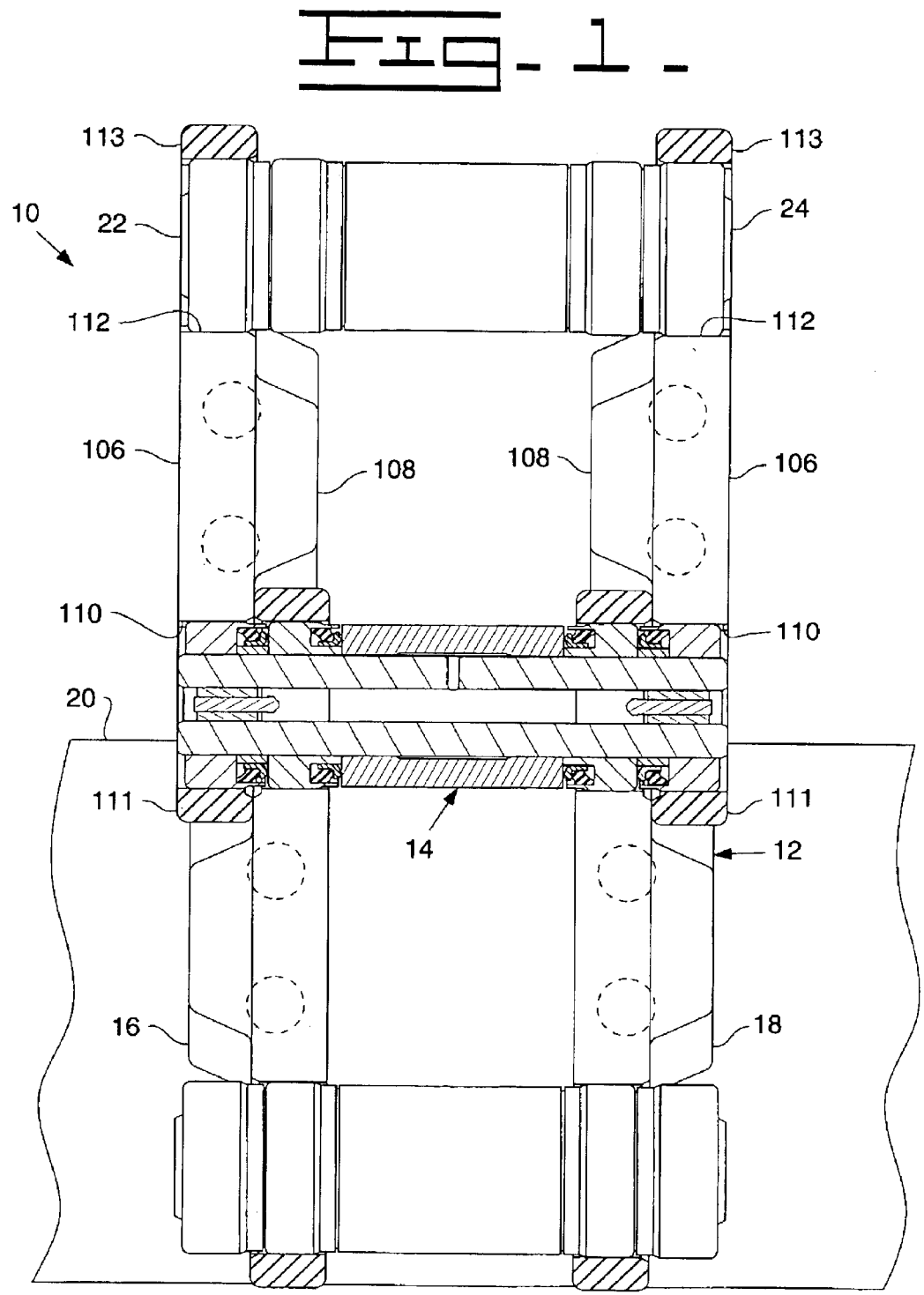
FIG. 1 is a top elevational view of a portion of a track chain assembly.

Referring now to FIG. 1, a track chain assembly 10, only a portion of which is shown, includes a plurality of subassemblies 12. Each subassembly 12 includes a cartridge assembly 14, an inner and outer link 16,18 and a track shoe 20 connected to the outer and inner links 16,18. A number of subassemblies 12 are mechanically coupled to adjacent subassemblies 12 so that when an appropriate number of these sub assemblies 12 are connected together, the track chain assembly 10 is formed. The track chain assembly 10 has a predetermined length for a given application with opposite ends that are capable of being connected together to form a closed loop. The closed loop is formed by mechanically coupling the opposite ends together with an outer and inner master link 22,24.

Figure 3:
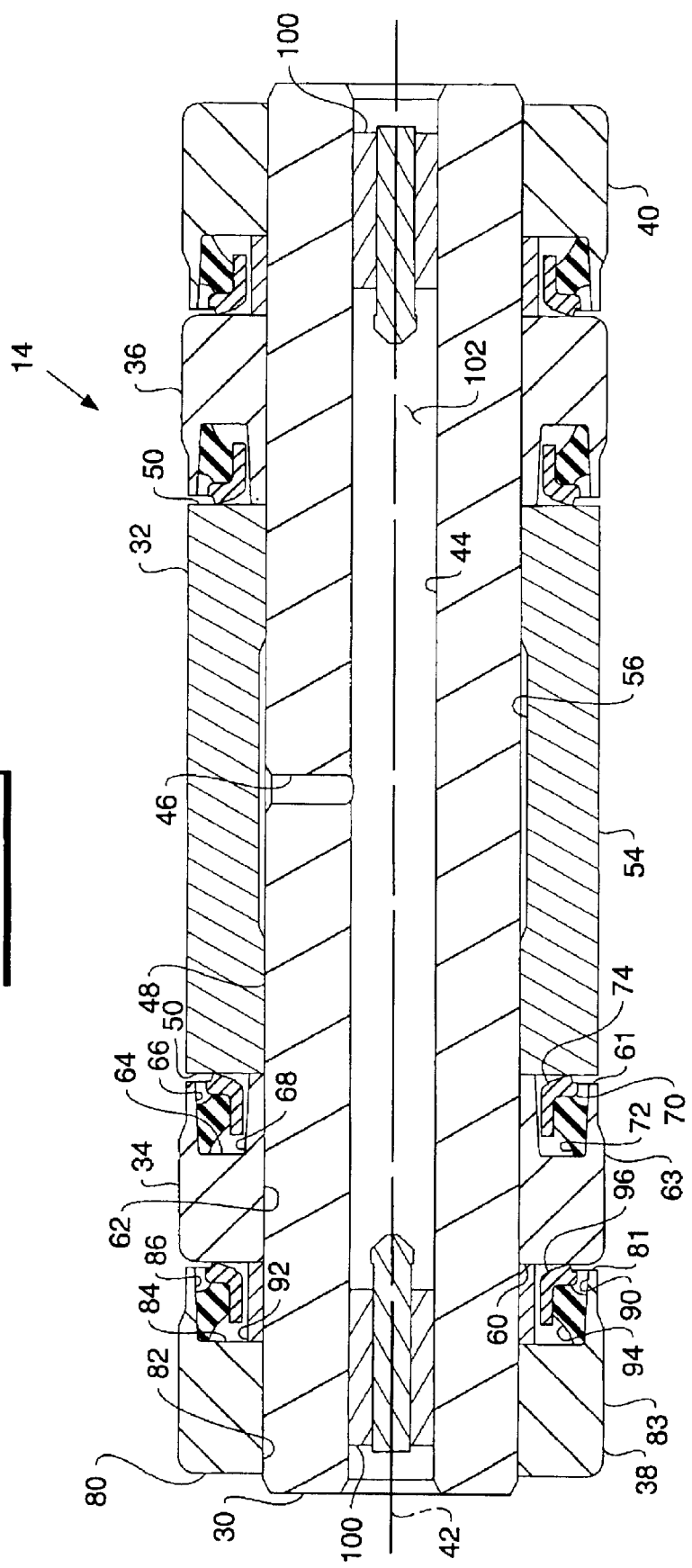
FIG. 3 is a longitudinal cross sectional view of a cartridge assembly of the track chain shown in FIG. 1.

As shown in FIG. 3, cartridge assembly 14 includes a track pin 30, a bushing 32, first and second bearing members 34,36, and first and second collars 38,40. The track pin 30 defines a central longitudinal axis 42 and has a bore 44 concentrically positioned therethrough. A cross bore 46 extends from an outer surface 48 of the track pin 30 inward towards the bore 44 normal to the central longitudinal axis 42. Bushing 32 has an end face 50, an outer surface 54 and a passage 56 concentrically positioned in respect to the outer surface 54. It should be appreciated that the first bearing member 34 and first collar 38 are substantially identical to the second bearing member 36 and second collar 40, therefore only first bearing member 34 and first collar 38, respectively will be described in detail herein.

First bearing member 34 includes a first end portion 60, a second end portion 61, a bore 62 and an outer surface 63. The first end portion 60 extends radially outward away from the bore 62 and forms an abutting surface. A seal groove 64 is positioned in the second end portion 61 such that seal groove 64 is concentric with central longitudinal axis 42. The seal groove 64 has an outer wall segment 66 and an inner wall segment 68. Wall segment 66 is tapered outwardly with respect to the central longitudinal axis 42 at a predetermined angle, preferably the predetermined angle is about 5°. In a similar manner inner wall segment 68 is tapered inwardly with respect to central longitudinal axis 42. It should also be recognized that the inner wall segment 68 extends axially beyond the outer wall segment 66, the benefits of which will be described in more detail below.

Still referring to FIG. 3, a seal arrangement 70 is shown positioned in the seal grove 64. Seal arrangement 70 includes an annular load ring 72 and a seal member 74. Load ring 72 and seal member 74 are positioned in seal groove 64 so that load ring 72 urges seal member 74 in an axial direction outward from the seal groove 64. Having outer wall segment 66 angled away from the central longitudinal axis 42 in the above described manner facilitates the insertion of load ring 72 and seal member 74 into seal groove 64. In particular, the predetermined angle of outer wall segment 66 enhances the installation capability of machinery utilized to insert seal arrangement 70 into seal groove 64.

First collar 38 includes a first end portion 80, a second end portion 81, a bore 82, and an outer surface 83. The first end portion 80 extends outward from the bore 82 and forms an outer radial surface. A seal groove 84 is positioned in the second end portion 81 such that seal groove 84 is concentric with central axis 42. The seal groove 84 has an outer wall segment 86. Wall segment 86 is tapered outwardly with respect to central longitudinal axis 42 at a predetermined angle similar to the outer wall segment 66 of the first bearing member 34. Again preferably, the predetermined angle is about 5°.

Still referring to FIG. 3, a seal arrangement 90 and an annular axial preload member 92 are shown positioned in the seal grove 84. Seal arrangement 90 includes an annular load ring 94 and a seal member 96. Load ring 94 and seal member 96 are positioned in seal groove 84 so that load ring 94 urges seal member 96 in an axial direction outward from the seal groove 84.

Although the example disclosed herein has a seal groove 64 positioned in the bearing members 34,36 and a seal groove 84 positioned in the collars 38,40, it is also contemplated that alternative positions for the seal grooves 64,84 could be used. For example, a seal groove may be positioned in each end face 50 of the track bushing 32, with each of the bearing members 34,36 flipped end for end and the collars 38,40 would be void of a seal groove 84. Additionally, the bearing members 34,36 may not have seal grooves and instead seal grooves only placed in the collars 38,40 and each end face 60 of the track bushing 32 for comparable capability, function and results.

A pair of plugs 100 are positioned in the bore 44 of the track pin 30 forming a fluid reservoir 102 in the bore 44 thereof. The pair of plugs 100 sealably prevents a fluid, such as lubricating oil, from leaking from the bore 44. In use, fluid disposed within fluid reservoir 102 of the cartridge assembly 14, is in fluid communication with and advanced through cross bore 46 to the outer surface 48 of track pin 30. Once disposed on outer surface 48, the fluid facilitates the rotation of first and second bearing members 34,36, and bushing 32 relative to track pin 30. Retention of the fluid within the cartridge assembly is assisted by seal arrangements 70,90, the first ends 60 of bearing members 34,36, and the end faces 50 of the bushing 32 while keeping debris out (e.g. sand, dirt, etc).

Figure 2:
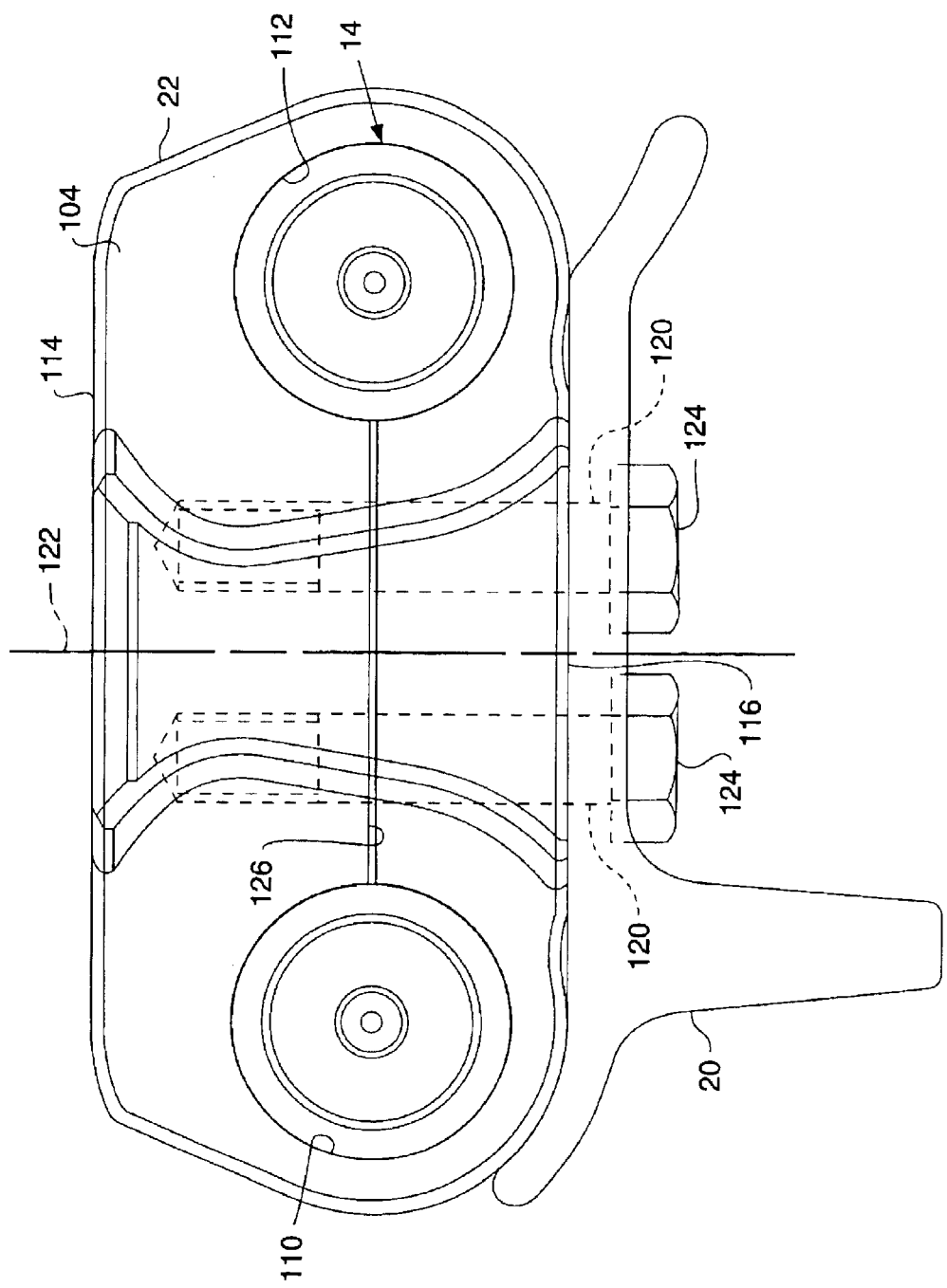
FIG. 2 is a side elevational view of a master link from FIG. 1.

Referring now to FIGS. 1 and 2, the inner and outer link 1618 and the inner and outer master links 22,24 in this embodiment are shown as being straight links each having a first end portion 111 and a second end portion 113. The inner master link 22 is an exact duplicate of the outer master link 24 therefore only inner master link 22 will be described in detail and the same elements will be represented by like numbers. It should be recognized that the terms outer and inner, in reference to links 16,18 and master links 22,24, in this example are used merely as descriptors for the orientation shown in the figures. Other terms such left, right and first, second could be interchangeably used as well.

Inner link 22 includes a body portion 104 with a first side 106 and a second side 108 spaced opposite the first side 106. A first aperture 110 extends through the first end portion 111. A second aperture 112 extends through the second end portion 113. Body portion 104 also includes a rail surface 114 and a shoe surface 116. An aperture 120 is positioned on both sides of and a predetermined distance from a central vertical axis 122. It should be appreciated that each aperture 120 is laterally centered with respect to the widest portion of body portion 104. A fastener 124 is positioned in each of the aperture 120 and utilized to secure track shoe 20 to shoe surface 116 of inner master link 22. Additionally, a gap 126 is formed between the first aperture 110 and the second aperture 112 extending through the body portion 104 from the first side 106 to the second side 108. As the fasteners 124 are tightened to secure the track shoe 20 to the inner master link 22 the width of the gap 126 is reduced or pulled together, effectively reducing the diameter of the first and second aperture 110,112. Thus, the first aperture 110 and the second aperture 112 are secured to the collars 38,40 of adjacent cartridge assemblies 14.

Figure 4:
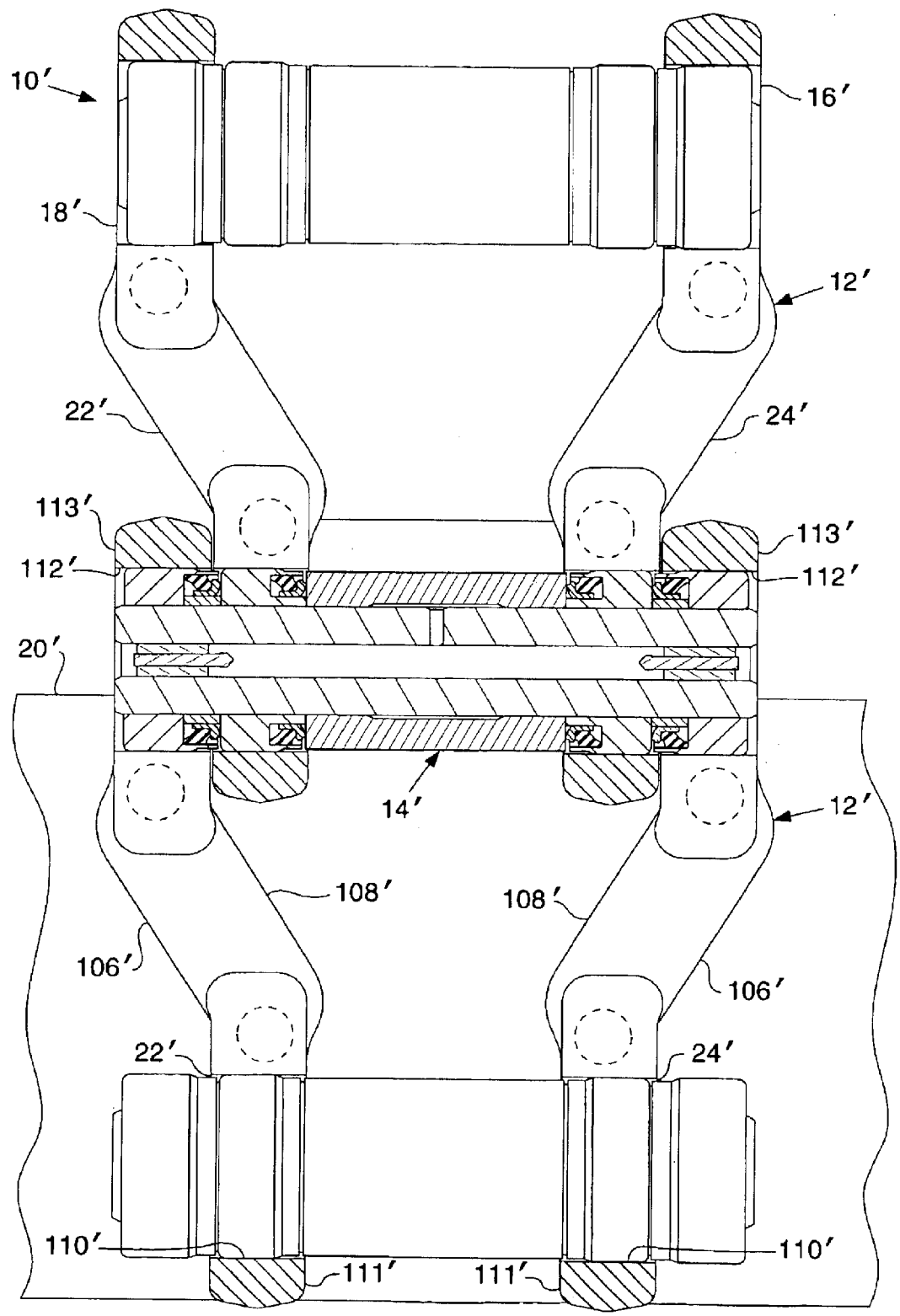
FIG. 4 is a top elevational view of an alternate embodiment of a portion of the track chain assembly.

Referring now to FIGS. 4 and 5, an alternate embodiment of the track chain assembly 10, only a portion of which is shown, with like elements of the first embodiment being represented by a prime designation. The track chain assembly 10' includes a plurality of subassemblies 12'. Each subassembly 12' includes a cartridge assembly 14', an inner and outer link 16',18' and a track shoe 20' connected to the inner and outer links 16',18'. An inner and outer master link 22',24' is used to connect opposite ends of the track chain assembly 10' to form a closed loop.

The inner and outer links 16',18' and the inner and outer master links 22',24', in this embodiment, are offset links each being a mirror image of the other, the inner master link 22' therefore will be described in detail. Inner link 22' includes a body portion 104' having a first side 106', a second side 108', a first aperture 110', a second aperture 112', a rail surface 114', and a shoe surface 116'. Body member 104' also has an exit hole 130 interposed between first aperture 110' and second aperture 112'. A bolthole 120' is positioned on either side of a vertical axis 122'. Apertures 120' are positioned at a predetermined angle with respect to the central vertical axis 122'. A fastener 124' is positioned in each of the apertures 120' and utilized to secure track shoe 20' to shoe surface 116' of inner master link 22'. Additionally, a gap 126' is positioned between the first aperture 110' and the second aperture 112' and extends through the exit hole 130 from the first side 106' to the second side 108'. As the fasteners 124' are tightened to secure the track shoe 20' to the inner and outer master links 22',24' the diameter of the first and second aperture 110',112' is effectively reduced. Thus, the first apertures 110' are secured to bearing members 34',36' of one cartridge assembly 14' and the second apertures 112' are secured to the collars 38',40' of an adjacent cartridge assembly 14'. In this embodiment, however, the inner and outer links 16',18' and the inner and outer master links 22',24' are offset links. Therefore, this application would require a pair of inner master links 22' and a pair of outer master links 24'. In this manner, the first aperture 110' of an inner and outer master link 22',24' is secured to the bearing members 34',36' of one cartridge assembly 14' and the second aperture 112' of an adjacent inner and outer master link 22',24' is secured to the collars 38',40' of the same cartridge assembly 14'.

Industrial Applicability

The track chain assembly 10,10' is assembled and operates as follows. The track pin 30 is inserted into passageway 56 of bushing 32 such that bushing 32 can rotate relative to track pin 30. Seal arrangements 70 are inserted into the seal groove 64 of the bearing members 34,36. The bearing members 34,36 are positioned relative to track pin 28 and bushing 32 such that a portion of track pin 30 extends through bore 62. The seal groove 64 of each bearing member 34,36 is positioned in an adjacent relationship to each end face 50 of bushing 32. This positions the seal member 74 to be urged against end face 50 of bushing 32. It should be appreciated that bearing members 34,36 can rotate about the track pin 30 in an oscillatory manner around axis 42 relative to both bushing 32 and track pin 30.

Annular axial preload members 92 are positioned about the outer surface 48 of the track pin 30 adjacent to the first end portion 60 of the bearing members 34,36. Seal arrangements 70 are inserted into the seal groove 84 of the collars 38,40. The collars 38,40 are positioned relative to track pin 30 and bearing member 34,36 so that a portion of track pin 30 extends into bore 82 with the second end portion 81 of collars 38,40 in an adjacent relationship to the first end portion 60 of bearing members 34,36. This positions the seal member 94 to be urged against the first end portion 60 of each bearing member 34,36. The annular axial preload member 92 controls the distance between the collars 38,40 and bearing members 34,36. In a similar manner, the inner wall segment 68 controls the distance that the bearing members 34,36 can be moved axially inward toward the bushing 32.

The collars 38,40 are fixed relative to track pin 30 so that collars 38,40 will not rotate or move axially relative to track pin 30. For example, collars 38,40 can be press fit or laser welded onto the track pin 30 or connected in any other suitable manner such as adhesive or chemical bonding. Attaching collars 38,40 to track pin 30 in this manner helps control end play of track chain assembly 10,10'.

As previously mentioned, referring to FIG. 1, each subassembly 12 includes a cartridge assembly 14, an inner link 16, an outer link 18 and a track shoe 20 fastened to the shoe surface 116 of the inner and outer links 16,18. Specifically, one subassembly is completed by positioning inner link 16 relative to cartridge assembly 14 such that bearing member 34 of cartridge assembly 14 is located within aperture 112 of inner link 16, bearing member 36 of cartridge assembly 14 is located within aperture 112 of outer link 18 forming a subassembly 12. The next adjacent subassembly 12 would be an outer subassembly 12, comprised of identical components that has the inner link 16 positioned relative to cartridge assembly 14 so that collar 38 is located within aperture 110 of inner link 16 and collar 40 is located within aperture 110 of outer link 18. It should be appreciated that bearing members 34,36 and collars 38,40 are press fit into apertures 110 and 112 of the inner and outer links 16,18. The outer subassembly 12 is fixed relative to collars 38,40 and the track pin 30, with an inner subassembly 12 fixed relative to bearing members 34,36. This allows the inner subassembly 12 to move relative to the track pin 30 and bushing 32, while the outer subassembly 12 is fixed relative to the track pin 30 but free to pivot relative to the bearing members 34,36 and the track bushing 32.

This alternating connection of inner and outer assemblies is continued until an appropriate number of adjacent sub assemblies 12 are connected together to form a track chain assembly 10 of a given length. Then an inner and outer master link 22,24 are slid over the collars 38,40 of two adjacent subassemblies and the last track shoe 20 is fastened in place. By tightening fasteners 124 the width of the gap 126 is reduced or pulled together effectively reducing the diameter of the first and second aperture 110,112, securing the first and second apertures 110,112 to the collars 38,40 of the two adjacent subassemblies 12.

In the alternate embodiment shown in FIGS. 3 and 4, each subassembly 12' includes a cartridge assembly 14', an inner link 16', an outer link 18' and a track shoe 20' fastened to the shoe surface 116' of the inner and outer links 16',18'. Specifically, one subassembly is completed by positioning inner link 16' relative to cartridge assembly 14' such that bearing member 34' of cartridge assembly 14' is located within aperture 110 ' of inner link 16', bearing member 36' of cartridge assembly 14' is located within aperture 110' of outer link 18' forming a sub assembly 12'. Two adjacent subassemblies 12' are secured together by placing collar 38' within aperture 112' of the inner link 16' and collar 40' within aperture 112' of outer link 18'. It should be appreciated that bearing members 34',36' are press fit into apertures 110' and collars 38',40' are press fit into apertures 112' of the inner and outer links 16',18'. The first end portion 111' of each inner and outer link 16',18' is fixed relative to bearing members 34',36' and the second end portion 113' of the inner and outer links 16',18' fixed relative to collars 38',40' and the track pin 30' of an adjacent an subassembly 12'. This allows the first end portion 111' of inner and outer links 16',18' to move relative to the track pin 30' and bushing 32', while the second end portion 113' is fixed relative to the track pin 30' but free to pivot relative to the bearing members 34',36' and the track bushing 32' of an adjacent subassembly 12'.

The connection of subassemblies 12' is continued until an appropriate number of adjacent subassemblies 12' are connected together to form a track chain assembly 10' of a given length. To connect the ends of the track chain assembly 10' of this embodiment together, two inner and outer master links 22',24' are required. Apertures 110' of the first end portion 111' of an inner and an outer master link 22',24' are positioned around the bearing member 34',36' of a cartridge assembly 14'. Apertures 112' of the second end portion 113' of an adjacent set of inner and outer master links 22',24' are positioned around collars 38',40' of the same cartridge assembly 14'. The last two track shoes 20' are then fastened to the shoe surface 116' of the two adjacent sets of inner and outer master links 22',24'. By tightening fasteners 124' the width of the gap 126' is reduced or pulled together effectively reducing the diameter of the first and second apertures 110',112', securing the first apertures 110' to the bearing members 34',36' and the second apertures 112' to the collars 38',40' of the same cartridge assembly 14'. Disconnecting the ends of the track chain assembly 10' of this embodiment requires loosening the fasteners 124' of the adjacent sets of inner and outer master links 22',24', this allows a single cartridge assembly 14' to be removed and the ends of the track chain assembly 10' to be separated.

What is claimed is:

1. A master link for a track chain assembly comprising:
   a unitary body portion having a first side, a second side positioned opposite the first side, a shoe surface adapted to receive a track shoe, and a rail surface positioned opposite the shoe surface;
   a first end portion defining a first aperture extending through the body portion from the first side to the second side;
   a second end portion defining a second aperture extending through the body portion from the first side to the second side, said second aperture being spaced from said first aperture; and
   said unitary body portion including a gap extending radially from said first and said second apertures.

2. The master link of claim 1, including at least one aperture extending from the shoe surface through said gap towards the rail surface.

3. The master link of claim 2, including a fastener operatively engaging said aperture and operatively reducing the width of said gap upon securing of said fastener thereby changing the diameter of said one of said first and second apertures.

4. The master link of claim 3, wherein said master link is an offset link.

5. The master link of claim 3, wherein said master link is a straight link.

6. The master link of claim 3, including an aperture positioned on each side of a central axis and extending from the shoe surface through said gap towards the rail surface.

7. The master link of claim 6, wherein said apertures are positioned at a predetermined angle relative to said central vertical axis.

8. The master link of claim 6, including at least one exit hole interposed said apertures and extending from said first side through to said second side.

9. The master link of claim 6, including a fastener positioned in each aperture and extending through a track shoe and fastenably securing said track shoe to the shoe surface.

10. A track chain assembly having opposite ends capable of being coupled together to form a closed loop, said track chain assembly comprising:
   a plurality of subassemblies each being connected to an adjacent subassembly;
   a one-piece inner master link and a one-piece outer master link connecting the opposite ends of the track chain assembly together;
   wherein each of said one-piece inner master link and said one-piece outer master link, each includes:
      a body portion having a first side, a second side positioned opposite the first side, a shoe surface adapted to receive a track shoe positioned opposite a rail surface;
      said body portion having a first end portion defining a first aperture extending from the first side to the second side;
      said body portion having a second end portion defining a second aperture extending from the first side to the second side, said second aperture being spaced from the first aperture; and
      said body portion including a gap extending radially from said first and said second apertures.

11. The track chain assembly of claim 10, wherein each of said plurality of sub assemblies includes a cartridge assembly, an inner link, an outer link and a track shoe.

12. The track chain assembly of claim 10, wherein each of said one-piece inner master link and said one-piece outer master link is an offset link.

13. The track chain assembly of claim 12, including a pair of one-piece inner master links and a pair of one-piece outer master links.

14. The track chain assembly of claim 10, wherein each of said one-piece inner master link and said one-piece outer master link is a straight link.

15. The track chain assembly of claim 10, wherein each of said one-piece inner master link and said one-piece outer master link includes at least one aperture extending from the shoe surface through said gap towards the rail surface.

16. The track chain assembly of claim 15, including a fastener operatively engaging said aperture and operatively reducing the width of said gap upon securing of said fastener thereby changing the diameter of said first and second apertures.

17. The track chain assembly of claim 16, wherein said fastener operatively securing of a track shoe to said shoe surface.

* * * * *